Aug. 18, 1970     R. B. BURDEN, JR., ET AL     3,524,597
APPARATUS FOR SHREDDING MATERIAL SUCH AS BULK PAPER
Original Filed Jan. 30, 1967     2 Sheets-Sheet 1

INVENTORS
ROY B. BURDEN, JR.
BY ERNEST J. O'GIEBLYN

ATTORNEY

INVENTORS
ROY B. BURDEN, JR
ERNEST J. O'GIEBLYN
BY
ATTORNEY

United States Patent Office 3,524,597
Patented Aug. 18, 1970

3,524,597
APPARATUS FOR SHREDDING MATERIAL SUCH AS BULK PAPER
Roy B. Burden, Jr., Sherwood, and Ernest J. O'Gieblyn, Portland, Oreg., assignors, by mesne assignments, to Edgar P. Marston, Jr., trustee for Marston Brothers Trust
Original application Jan. 30, 1967, Ser. No. 612,654, now Patent No. 3,453,976, dated July 8, 1969. Divided and this application Sept. 23, 1968, Ser. No. 761,586
Int. Cl. B02c 18/26
U.S. Cl. 241—142                    9 Claims

ABSTRACT OF THE DISCLOSURE

A slasher comprising a housing containing rows of adjustable cutter supports, each carrying cutters on the outer ends thereof. These cutters are circumferentially linked to one another. The cutters of one row are interposed between the cutter supports of the next adjacent row. Oscillatable fingers are interposed between the cutter supports of certain of the rows. Means in the form of frustoconical surfaces are interposed between adjacent cutter supports in the same row, the surfaces tapering inwardly from each of the supports.

CROSS-REFERENCES TO RELATED APPLICATIONS

The present application is a division of application Ser. No. 612,654, filed Jan. 30, 1967, now Pat No. 3,453,976.

BACKGROUND OF THE INVENTION

Field of the invention

The invention is directed to slashers or shredders of the type employing movable cutters.

Description of the prior art

As far as applicants are aware, the prior art does not disclose slashers having the specific features of cutter supports which are movable about their respective axes, each support carrying circumferentially spaced cutters.

SUMMARY OF THE INVENTION

The rows of cutter supports with circumferentially linked cutters thereon are disposed in an open-top housing which receives the material to be shredded. Two of the adjacent supports and cutters thereon are rotated, preferably in opposite directions. Also, an adjacent row of cutter supports and the cutters thereon are oscillated. The cutters of a row project into the spaces between the cutter supports of the next adjacent row or rows.

A row of oscillatable fingers project into spaces between the cutter supports and cutters of the next adjacent row of supports.

Other features and the advantages of the present invention will be apparent from the following description, reference being had to the accompanying drawings wherein a preferred embodiment of the invention is illustrated.

DESCRIPTION OF THE PREFERRED EMBODIMENT

Figure 2:
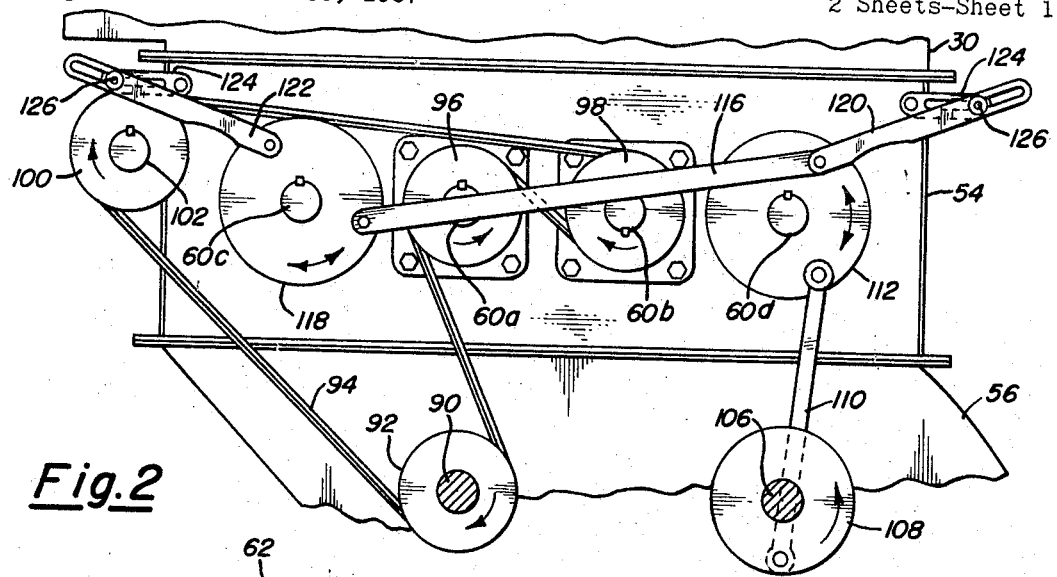
FIG. 2 is a fragmentary side elevational view of the slasher unit showing the drive therefor, taken along the line 2—2 of FIG. 1.

The slasher unit 10 has a vertically extending housing including a receiving portion 30 connected with a housing 54 of rectangular cross section for housing the slasher mechanism, and a lower chute 56 which descends at a slight inclination. Housing 54 houses four horizontally spaced rows of cutter supports in the form of discs 58, with all of the discs in each row being fixedly mounted on one of four parallelly disposed shafts 60. Each shaft is journaled in bearings 62 at opposite sides of the housing. The discs on each shaft are spaced from each other and from the sides of the housing by frustoconical spacer cups 64 which may be affixed to the shaft by set screws (not shown) or other suitable means. Each cup includes a wide base portion 65 which abuts a disc, and a surface which tapers inwardly and away from the disc to a narrow base portion 66. There are two such spacer cups between each adjacent pair of discs, with the narrow bases of the two cups abutting one another midway between the pair of discs. These cups not only serve as spacers, but also guide the material to be shredded toward the cutting elements of a disc in an adjacent row and help prevent clogging of material between adjacent discs.

Each disc 58 has a series of cutters 68 circumferentially spaced from one another and mounted on its outer periphery. In the illustrated embodiment these cutters form part of conventional cutter links 70 of a length of saw chain 72 such as the illustrated so-called "chipper" type saw chain shown in FIGS. 3 and 4 and used commonly in the timber cutting field. To receive the chain, the peripheral edge 74 of each disc is provided with a central and radially extending slot 76 which receives a projecting wing portion of the center links of the chain while the side links engage the peripheral edge. Pins (not shown) extending laterally through the peripheral edge portion of each disc and through certain of the center links may be provided at intervals about the disc to anchor the chain against circumferential slippage on the disc, although these are not absolutely necessary, for centrifugal force during rotation or oscillation of the discs is usually sufficient to maintain the chain in place.

Figure 1:
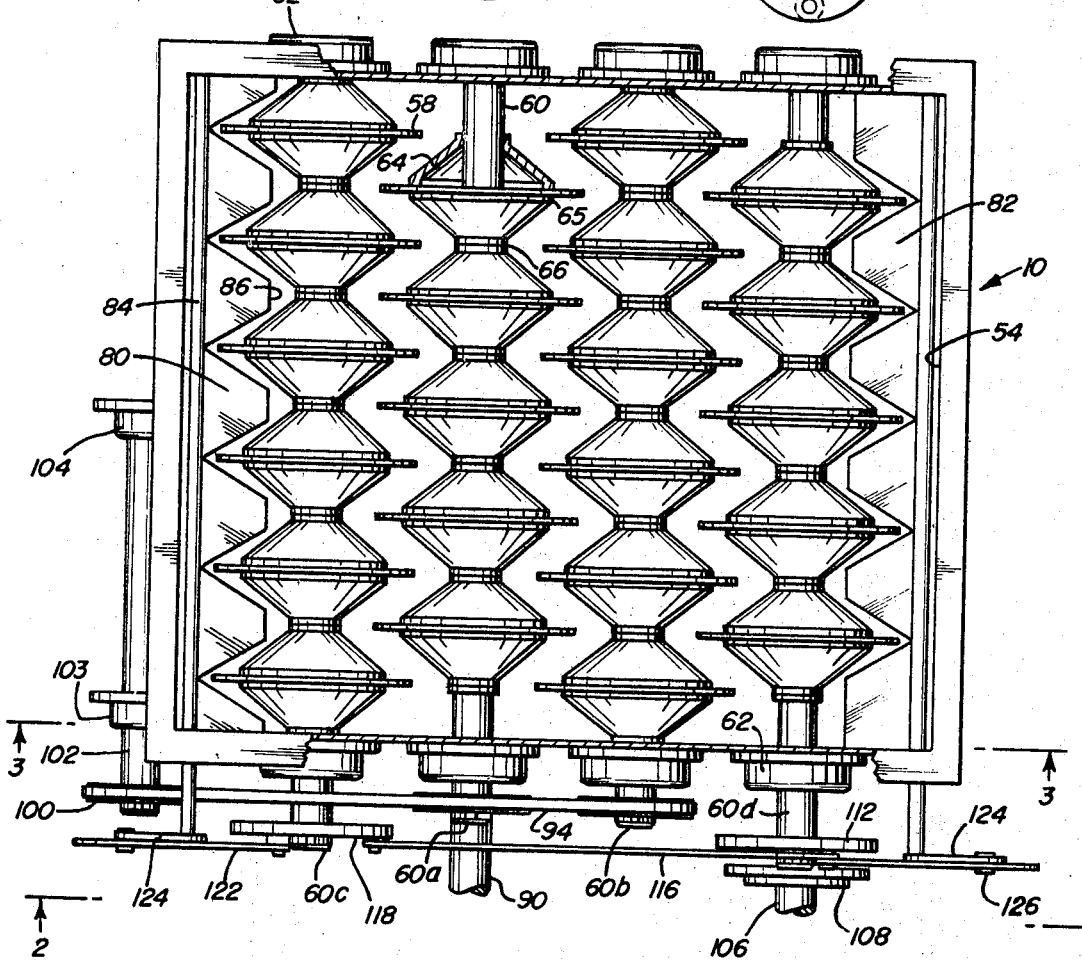
FIG. 1 is a top plan view of the slasher, part of the compartment or hopper for feeding material to be shredded being shown in section.

The unusually effective cutting action of the slasher mechanism is achieved, to a large extent, through the specific interrelationship of the discs in each row with the discs in the adjacent rows. As shown in FIG. 1, the peripheral portions of the discs in each row have an interdigital relationship with the same portions of the discs in each adjacent row. That is, the discs in each row project into the spaces between discs in the adjacent rows and in line with the narrow neck defined by the spacer cups in the adjacent rows. With the discs thus interrelated, the two center disc shafts 60a and 60b are rotated in opposite directions, and specifically in directions toward the discs on the two end shafts 60c and 60d as viewed from above the discs. At the same time the two end shafts oscillate. Thus material fed onto the discs from above is fed by the interaction of the discs into the spaces therebetween to be shredded by the cutters into particles, which then pass downwardly between the discs into the chute 58 below.

Figure 3:
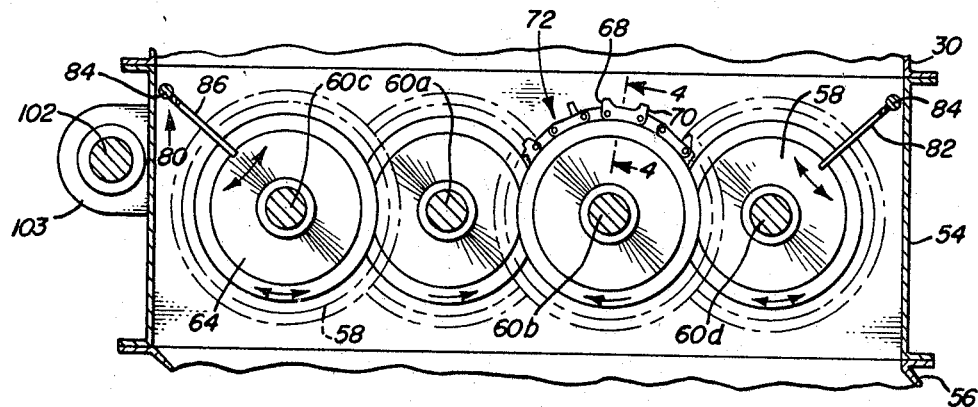
FIG. 3 is a vertical sectional view through the slasher unit taken along the line 3—3 of FIG. 1.
Figure 4:
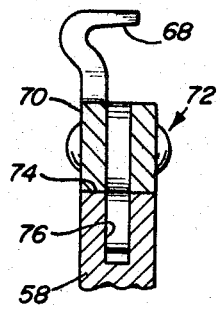
FIG. 4 is a fragmentary sectional view on a larger scale through a peripheral edge portion of one of the support discs taken along line 4—4 of FIG. 3.

Referring to FIGS. 1 and 3, finger-like kicker plates 80 and 82 are provided at opposite ends of the housing to prevent a pile-up and jamming of material at these points. Such plates are mounted on kicker shafts 84 at a level slightly above the level of the latter shafts 60a, 60b, 60c and 60d. Each plate has a series of fingers 86 which extend into the spaces between adjacent discs in interdigital fashion. The fingers are inclined downwardly from their shafts toward the adjacent disc shafts 60c and 60d. The shafts, and thus the kicker plates, are oscillated through a small angle to propel material moved to the ends of the housing by the discs back toward the center of the housing.

Referring to FIGS. 1 and 2, the drive mechanism for the slasher unit includes a pair of independent drive motors (not shown), one for rotating the center pair of disc shafts and the other for driving the oscillating end disc shafts and kicker shafts. One motor has a drive shaft 90 which has a pulley 92 at its outer end about which a belt 94 is trained. Belt 94 is also trained about driven pulleys 96 and 98 on disc shafts 60a and 60b, respectively, and about an idler pulley 100 on an idler shaft 102 journaled in bearings 103 and 104 so as to rotate the discs on the two center shafts in the desired counterclockwise and clockwise directions, respectively.

The other drive motor has a drive shaft 106 having a crank disc 108 fixed to its outer end. A crank rod 110 is pivoted at one end to disc 108 and at its opposite end to a crank disc 112 on end disc shaft 60d, in such a manner that rotation of the drive shaft will oscillate the disc shaft through an angle of from about seventy to one hundred twenty degrees. A connecting rod 116 connects crank disc 112 to a crank disc 118 on end disc shaft 60c so as to transmit the oscillatory motion of the former shaft to the latter in synchronous fashion. Crank disc 112 and 118 also carry crank bars 120 and 122, respectively, which connect with levers 124 at corresponding ends of kicker shafts 84 through lost motion connections 126 to transmit a portion of the oscillatory motion of the end disc shafts 60c and 60d to their adjacent kicker shafts, and thus to the kicker plates.

Having described our invention, we claim:

1. Apparatus for shredding material such as bulk paper, said apparatus comprising in combination:
    (A) a housing;
    (B) a series of cutter supports arranged in parallel rows with the outer portions in each row being arranged in interposed relationship with the inner portions in the next adjacent rows;
    (C) means for supporting rows of cutter supports within the housing for movements about their respective axes;
    (D) means for effecting rotary movements to certain of the cutter supports about their respective axes;
    (E) means for effecting oscillatory movements to the other of the cutter supports about their respective axes;
    (F) a series of cutters arranged in circumferentially spaced relation to one another and carried by outer portions of each of the cutter supports.

2. Apparatus as defined in claim 1, characterized in that the second mentioned means effects rotation of one of the rows of cutter supports and that the third mentioned means effects oscillation of the next adjacent row.

3. Apparatus as defined in claim 1, characterized in that at least four rows of cutter supports are provided, each carrying cutters, the third mentioned means effecting oscillation of the outer two rows and the second mentioned means effecting rotation of the intermediate two rows.

4. Apparatus as defined in claim 1, characterized to include:
    (G) means forming frustoconical surfaces interposed between adjacent cutter supports in the same row, said surfaces of the last mentioned means in said row of said cutter supports tapering inwardly from one cutter support toward the next adjacent cutter support of said row of cutter supports.

5. Apparatus as defined in claim 1, characterized in that the cutters of a series of cutters are in the form of a chain.

6. Apparatus as defined in claim 3, characterized in that the second mentioned means effects rotation in opposite directions of the intermediate rows of cutter supports.

7. Apparatus as defined in claim 3, characterized in that the second mentioned means effects upward movements of confronting cutters of the intermediate two rows.

8. Apparatus for shredding material such as bulk paper, said apparatus comprising in combination:
    (A) a housing;
    (B) a series of cutter supports arranged in parallel rows with the outer portions in each row being arranged in interposed relationship with the inner portions in the next adjacent rows;
    (C) means for supporting rows of cutter supports within the housing for movements about their respective axes;
    (D) means for effecting movements of the cutter supports about their respective axes;
    (E) a series of cutters arranged in circumferentially spaced relation to one another and carried by outer portions of each of the cutter supports;
    (F) a set of movable fingers interposed between the cutter supports of one of the rows;
    (G) two shafts carried by the housing, one of said for oscillatable movement;
    (H) means for imparting oscillatory movement to the fingers.

9. Apparatus as defined in claim 3, characterized to include:
    (G) two shafts carried by the housing, one of said shafts being disposed parallelly with one of the outer rows of cutter supports and between said latter cutter support and the housing, and the other of said shafts being disposed parallelly with the other outer row of cutter supports and between the last mentioned support and the housing;
    (H) means pivotally carried by one of the shafts, said latter means including:
        fingers extending between each of the cutter supports of one of the rows of cutter supports;
    (I) means pivotally carried by the other shaft, said last mentioned means including:
        fingers extending between each of the cutter supports of the other row of cutter supports.

References Cited

FOREIGN PATENTS 1,224,757  2/1960  France.

LESTER M. SWINGLE, Primary Examinr

M. G. RASKIN, Assistant Examiner

U.S. Cl. X.R.

241—243

UNITED STATES PATENT OFFICE
CERTIFICATE OF CORRECTION

Patent No. 3,524,597                                                  August 18, 1970

Roy B. Burden, Jr., et al.

It is certified that error appears in the above identified patent and that said Letters Patent are hereby corrected as shown below:

Column 4, line 34, "two shafts carried by the housing", should read -- means for supporting the fingers in the housing --.

Signed and sealed this 16th day of March 1971.

(SEAL)
Attest:

Edward M. Fletcher, Jr.
Attesting Officer

WILLIAM E. SCHUYLER, JR.
Commissioner of Patents